United States Patent
Guggisberg

(10) Patent No.: US 9,648,139 B2
(45) Date of Patent: May 9, 2017

(54) INSERTING SERVER-SIDE BREAKPOINTS REQUESTED BY REMOTE DEVELOPMENT CLIENTS

(71) Applicant: Adobe Systems Incorporated, San Jose, CA (US)

(72) Inventor: Stefan Guggisberg, Basel (CH)

(73) Assignee: Adobe Systems Incorporated, San Jose, CA (US)

( * ) Notice: Subject to any disclaimer, the term of this patent is extended or adjusted under 35 U.S.C. 154(b) by 527 days.

(21) Appl. No.: 14/133,917

(22) Filed: Dec. 19, 2013

(65) Prior Publication Data
US 2015/0178251 A1 Jun. 25, 2015

(51) Int. Cl.
*G06F 11/00* (2006.01)
*H04L 29/06* (2006.01)
*G06F 11/36* (2006.01)
*G06F 17/30* (2006.01)
*H04L 29/08* (2006.01)

(52) U.S. Cl.
CPC ............. *H04L 67/42* (2013.01); *G06F 11/36* (2013.01); *G06F 11/3636* (2013.01); *G06F 17/30861* (2013.01); *H04L 67/02* (2013.01)

(58) Field of Classification Search
CPC ..... H04L 67/42; G06F 11/36; G06F 17/30861
See application file for complete search history.

(56) References Cited

U.S. PATENT DOCUMENTS

| | | | | |
|---|---|---|---|---|
| 6,353,923 B1* | 3/2002 | Bogle | ............... | G06F 9/45512 714/E11.21 |
| 8,464,254 B1* | 6/2013 | Vohra | ................. | G06F 11/1458 718/1 |
| 2002/0002571 A1* | 1/2002 | Manohar | .......... | G06F 17/30873 715/273 |

(Continued)

OTHER PUBLICATIONS

Barton, John J., et al., "Dynamic and Graphical Web Page Breakpoints", www '10 Proceedings of the 19th International Conference, ACM, Apr. 26, 2010, 10 pages.

*Primary Examiner* — Stephen Hong
*Assistant Examiner* — Marshon Robinson
(74) *Attorney, Agent, or Firm* — Kilpatrick Townsend & Stockton LLP

(57) ABSTRACT

In some embodiments, a server application can provide a web document to a development application. The web document is dynamically generated from source files. The web document includes element code segments for rendering respective elements of the web document in a browser. Each element code segment includes respective metadata for identifying a respective source file used to generate the element code segment. The server application can receive a breakpoint request from the development application to insert at least one breakpoint in at least one source file identifiable using the metadata in the web document. The server application can insert the breakpoint in the source file responsive to the breakpoint request. The server application can provide an updated web document to the development (Continued)

application. The updated web document includes a subset of the element code segments dynamically generated by executing source code up to the breakpoint in the source file.

17 Claims, 5 Drawing Sheets

(56) References Cited

U.S. PATENT DOCUMENTS

| | | | |
|---|---|---|---|
| 2005/0105116 A1* | 5/2005 | Kobashi | G06F 17/211 358/1.12 |
| 2009/0313611 A1* | 12/2009 | Panchamukhi | G06F 9/32 717/129 |
| 2010/0162049 A1* | 6/2010 | Stall | G06F 11/3644 714/38.14 |
| 2011/0047415 A1* | 2/2011 | Nanjundaswamy | G06F 11/3636 714/37 |
| 2012/0272218 A1* | 10/2012 | Bates | G06F 11/3664 717/125 |
| 2014/0250368 A1* | 9/2014 | Wineman | G06F 17/211 715/235 |

\* cited by examiner

INSERTING SERVER-SIDE BREAKPOINTS REQUESTED BY REMOTE DEVELOPMENT CLIENTS

TECHNICAL FIELD

This disclosure relates generally to computer-implemented methods and systems and more particularly relates to inserting server-side breakpoints in response to requests from a remote development client.

BACKGROUND

Web-based applications may include interfaces accessible via a web site for performing one or more functions in response to user input. One or more web pages of a web-based application may be dynamically generated based on user input. For example, a web-based purchasing application may allow a purchaser to input product and payment information via fields in a first web page and provide a purchase confirmation to the user in a second web page.

Software developers that generate, update, or otherwise modify web-based applications may remotely access the source code used for dynamically generating web pages. A developer may wish to debug source code stored on a server that is used to dynamically generate a given web page. Debugging source code may involve inserting one or more breakpoints in the source code that allows a developer to pause execution at different states of the application.

Debugging server-side code of a complex Web application may present difficulties. For example, hypertext markup-language ("HTML") that defines a given web page may be dynamically generated by source code from many different source files on the server. A developer may need a complete understanding of the different source files involved in generating the HTML in order to resolve errors in the web page. In practice, such a complete understanding may be difficult to obtain, as complex web application having many aspects may be developed by different developers responsible for managing different aspects.

SUMMARY

One embodiment involves a method for inserting server-side breakpoints in response to a request from a remote development client. The method involves providing a web document to a development application. The web document is dynamically generated from source files. The web document includes element code segments for rendering respective elements of the web document in a browser. Each element code segment includes respective metadata for identifying a respective source file used to generate the element code segment. The method also involves receiving a breakpoint request from the development application to insert at least one breakpoint in at least one source file identifiable using the metadata in the web document. The method also involves inserting the breakpoint in the source file responsive to the breakpoint request. The method also involves providing an updated web document to the development application. The updated web document includes a subset of the element code segments dynamically generated by executing source code up to the breakpoint in the source file.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Various features, embodiments, and advantages of the present disclosure are better understood when the following Detailed Description is read with reference to the accompanying drawings, where.

DETAILED DESCRIPTION

Figure 1:
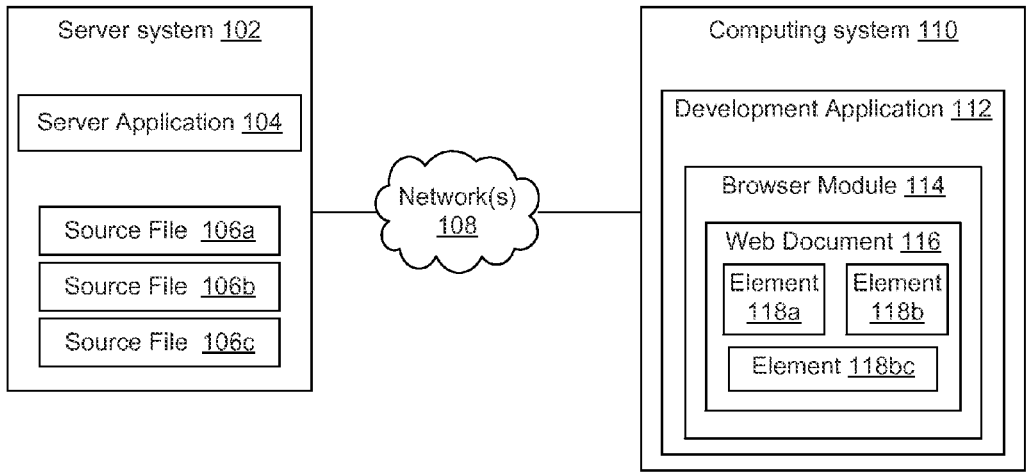
FIG. 1 is a block diagram depicting an example of a server system for remotely inserting server-side breakpoints in response to requests from a remote computing system according to certain exemplary embodiments.

Computer-implemented systems and methods are disclosed for a server application inserting server-side breakpoints in response to requests from a development application executed at a remote computing system. It may be desirable for a developer to debug a web-based application by specifying breakpoints using a web page that is dynamically from multiple source files, rather than the developer directly inserting the breakpoints in the source files. A developer specifying the breakpoints using the dynamically generated web page can avoid the need for the developer to know which source file need to be accessed in order to insert the breakpoints.

The following non-limiting example is provided to help introduce the general subject matter of certain embodiments. Source code for a web application hosted by a server can be modified or otherwise accessed over a network by a development application. The development application can include any application configured to debug, modify, or otherwise use executable code of an application. The server can dynamically generate hypertext markup-language ("HTML") for different web pages of the web application, such as a purchase order request web page and a purchase order confirmation web page generated based on inputs to the web application. Different HTML elements of each web page can be generated by different source files. The server can include metadata with the web pages that identifies the source files used to generate different HTML elements. The server can provide the dynamically generated web pages to the development application. In the development application, a user can select an element of the web page and send a request to the server to insert a breakpoint in a source file that generated the element. The development application can use the metadata in the web page to generate the breakpoint request used to identify the source file. The server can insert the breakpoint in the appropriate source file in response to the breakpoint request. Thus, a developer may intuitively debug problematic elements in a rendered web page or other HTML output without the developer having detailed knowledge of the server-side code base used to dynamically generate the HTML.

In accordance with some embodiments, a server application can provide a web document to a development application. The web document is dynamically generated from source files. For example, the source files may include an HTML document used to provide static elements (e.g., a title, placement of windows, etc.) as well as JavaScript or other scripting files used generate HTML elements based on parameters of a request (e.g. information entered by a user into one or more fields in a web site). The web document includes HTML segments or other element code segments for rendering respective elements of the web document in a browser. Each element code segment includes respective metadata for identifying a respective source file used to generate the element code segment. The server application can subsequently receive a breakpoint request from the development application to insert at least one breakpoint in at least one source file identifiable using the metadata in the web document. The server application can respond to the breakpoint request by inserting the breakpoint in the source file. The server application can provide an updated web document to the development application. The updated web document includes a subset of the element code segments dynamically generated by executing source code up to the breakpoint in the source file.

As used herein, the term "web document" refers to any document that can be accessed via a web site and rendered in a browser application. A non-limiting example of a web document is a web page of a web site.

As used herein, the term "development application" refers to one or more modules used to develop software applications. A development application can include modules such as a source code editor, a debugger, a compiler, an interpreter, etc. In some embodiments, a development application can include a browser module that is used to render HTML or other web code for display as a web page. The browser module can provide a preview of a web document as the web document would be displayed by a stand-alone browser application.

As used herein, the term "source file" refers to any file used to dynamically generate a web document. Non-limiting examples of source files include one or more HTML documents, scripting files, image files, etc.

As used herein, the term "element" refers to a portion of a web document rendered for display by a browser application. Non-limiting examples of elements include tables, text, interface elements (e.g., fillable field, menus, buttons, etc.), and the like As used herein, the term "element code segment" refers to an HTML element or other code segment that can be interpreted by a browser application to render a corresponding element in a web page.

As used herein, the term "metadata" refers to data embedded in a web document that be accessed by a development application to determine one or more characteristics of the document or an element of the document. In one example, a web document such as an HTML document may include structured data about the web document in meta elements such as "<meta>". In another example, metadata may be included in a web document as one or more custom attributes of a given HTML element, such as "<div . . . x_source file="/some/file/path">". In some embodiments, metadata for identifying a source file can include the name or location of the source file. In other embodiments, metadata for identifying a source file can include a unique identifier for an element generated using the source file. The development application can generate a breakpoint request that includes the element identifier. The server application can correlate the element identifier received in the breakpoint request to the source file in which a breakpoint is to be inserted.

As used herein, the term "breakpoint" refers to a command in source code to halt or pause execution of the code. Halting or pausing execution of source code in response to a breakpoint can allow a developer to identify coding errors by observing the output of the source code near the breakpoint or by stepping through relevant source code or inspecting variables, a call stack, etc. using a suitable debugging tool.

Referring now to the drawings, FIG. 1 is a block diagram depicting an example of a server system 102 for remotely inserting server-side breakpoints in response to requests from a remote computing system 110 according to certain exemplary embodiments.

The server system 102 can execute a server application 104 that can dynamically generate web documents using source files 106a-c. A non-limiting example of a web document is an HTML page.

The remote computing system 110 can execute a development application 112 that is configured for modifying, debugging, or otherwise developing the server application 104a or other web-based application that uses the source files 106a-c. Outputs of the web-based application can include one or more web documents 116. The server system 102 can provide a web document 116 to the computing system 110 via the network 108. The web document 116 can include one or more elements 118a-c. Non-limiting examples of elements 118a-c include interactive elements of a web page or other graphical interface (e.g., fillable fields, buttons, pull-down menus, embedded media content, etc.) as well as non-interactive elements (e.g., text, static images, etc.).

In some embodiments, the development application 112 can include an integrated development environment. An integrated development environment can be a cross-platform runtime environment for different computing devices to create and modify electronic content. A development environment can also include one or more software modules for providing and receiving input specifying modifications to the electronic content. For example, the development application 112 can include a browser module 114. The browser module 114 can provide an embedded web browser for rendering, interacting with, or otherwise using the web document 116 outputted by the server application 104.

Although the browser module 114 is depicted as a module of the development application 112 for illustrative purposes, other implementations are possible. For example, in some embodiments, the development application 112 can communicate with a separate, stand-alone browser application that can render the web document 116.

Figure 2:
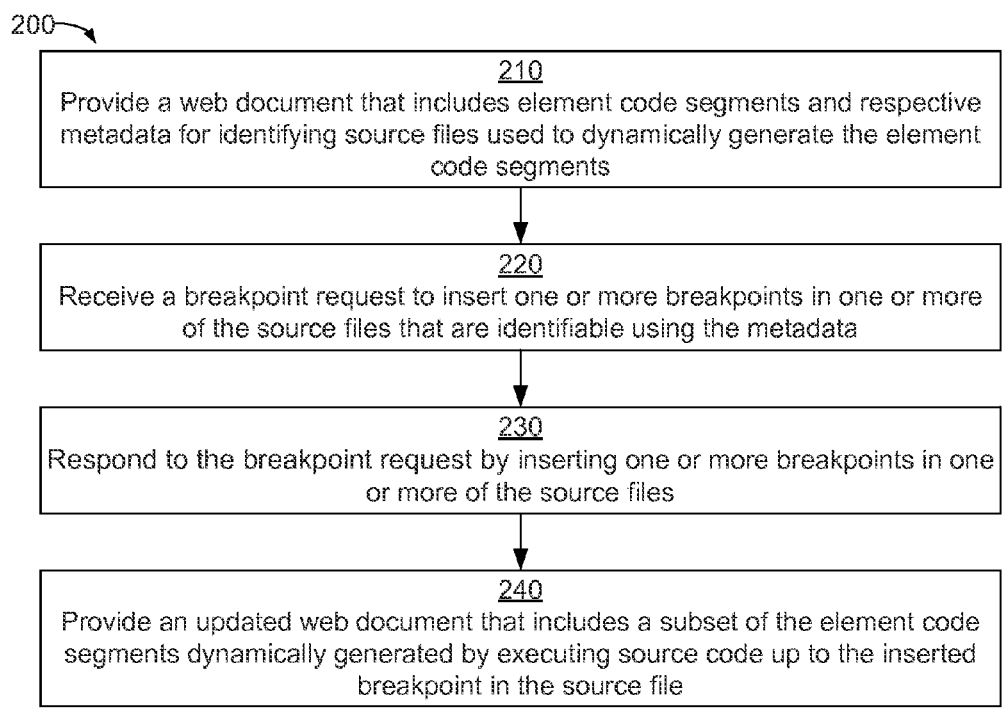
FIG. 2 is a flow chart depicting an example of a method for inserting server-side breakpoints in response to requests from a remote development client according to certain exemplary embodiments.

FIG. 2 is a flow chart depicting an example of a method 200 for inserting server-side breakpoints in response to requests from a remote development client according to certain exemplary embodiments. For illustrative purposes, the method 200 is described with reference to the system implementation depicted in FIG. 1. Other implementations, however, are possible.

The method 200 involves providing a web document that includes element code segments and respective metadata for identifying source files used to dynamically generate the element code segments, as depicted in block 210. For example, the server application 104 executed by the server system 102 can provide a web document 116 to the development application 112 executed by the computing system 110. The web document 116 can include segments of HTML or other suitable code that can be interpreted by a browser application (e.g., part of browser module 114) to display the elements 118a-c depicted in FIG. 1. Each HTML segment can include a META tag or other suitable tag, a custom attribute of an element defined by the HTML segment, or any other metadata that includes information that can be used to identify a source file that was executed to generate the HTML segment.

Figure 3:
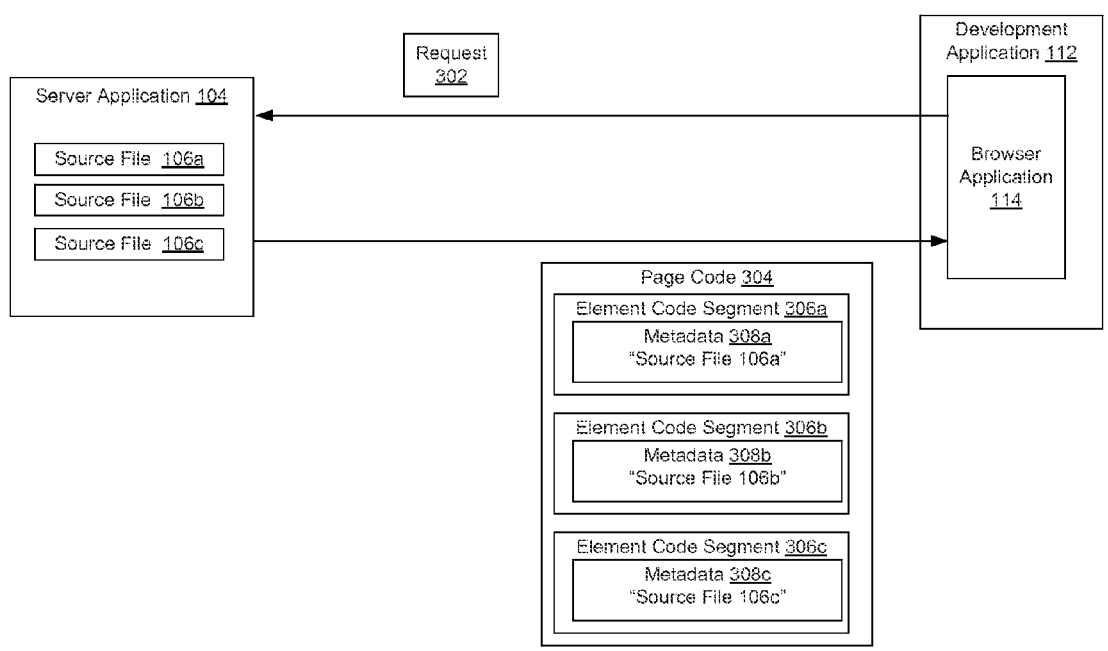
FIG. 3 is a block diagram depicting an example of a flow of communications for providing a dynamically generated web document from a server application to a development application according to certain exemplary embodiments.

FIG. 3 is a block diagram depicting an example of a flow of communications for providing a dynamically generated web document 116 from a server application 104 to a development application 112 (e.g., block 210 of FIG. 2). As depicted in FIG. 3, the browser module 114 or another suitable module of the development application 112 can provide a request 302 for a web document 116 to the server application 104. The request 302 may be generated in response to interacting with or otherwise accessing a web site hosted by or accessible via the server system 102. For example, the browser module 114 can send the request in response to the selection of a link to the web site or by performing some action in the web site (e.g., navigating to a portion of the web site, submitting a purchase order via the web site, etc.).

The server application 104 can dynamically generate page code 304 in response to the request 302. For example, the request 302 may be generated by submitting a purchase order via a web site hosted by the server system 102. The page code 304 may include HTML or other suitable code for a web page that is a purchase confirmation for the purchase order. The page code 304 can include element code segments 306a-c that can be interpreted by the browser module 114 to render corresponding elements of a web document 116. The page code 304 can be dynamically generated from multiple source files 106a-c.

In a non-limiting example, the server application 104 can generate HTML code for a web page using a main web page document defined by a source file in combination with additional related source files providing dynamically generate features of the web page. The main web page document, such as source file 106a, may define static features of a web page provided to a browser. The source file 106a may also reference related source files 106b, 106c that are used to provide dynamic features of a web page based on the parameters of a request 302. Non-limiting examples of related source files include scripting language files (e.g., JavaScript files, etc.), files defined using a template language (e.g., JavaServer Pages ("JSP"), Active Server Pages ("ASP"), etc.), and/or other files used to dynamically generate HTML code. The server application 104 may use the various source files 106a-c to generate HTML or other page code 304 that may be interpreted by a browser module 114 to render the web document 116 for display.

The server application 104 can embed metadata 308a-c in the page code 304 that can be used for identifying which of the source files 106a-c is used to generate corresponding element code segments 306a-c. In some embodiments, the metadata 308a-c can directly identify the source files 106a-c used to generate the element code segments 306a-c. For example, as depicted in FIG. 3, the element code segment 306a can include metadata 308a identifying source file 106a as the source file used to generate the element code segment 306a, the element code segment 306b can include metadata 308b identifying source file 106b as the source file used to generate the element code segment 306b, and the element code segment 306c can include metadata 308c identifying source file 106c as the source file used to generate the element code segment 306c. In other embodiments, each of the element code segments 306a-c can include a unique identifier for a corresponding one of the elements 118a-c. The server application 104 can maintain a look-up table or other file that correlates unique element identifiers to source files 106a-c used to generate different elements. Thus, although the page code 304 may not directly identify the source files 106a-c used to generate the element code segments 306a-c, the metadata 308a-c can include identifiers usable by the server application 104 to correlate element code segments 306a-c to the corresponding source files 106a-c.

Although FIG. 3 depicts each of the element code segments 306a-c being generated by a corresponding one of the source files 104a-c for illustrative purposes, other implementations are possible. For example, page code 304 can include multiple element code segments generated by one of the source files 104a-c.

Returning to FIG. 2, the method 200 also involves receiving a breakpoint request to insert one or more breakpoints, as depicted in block 220. The one or more source files are identifiable using the metadata. The breakpoint request can be received from a remote development client, such as a computing system 110 executing a development application 112. For example, the server application 104 executed by the server system 102 can receive a breakpoint request from the development application 112 to insert break points in one or more of the source files 106a-c. The development application 112 can provide a breakpoint request to the server application 104 to allow a user of the development application 112 to identify, debug, or otherwise analyze specific states of a web application caused by different source files 106a-c.

Figure 4:
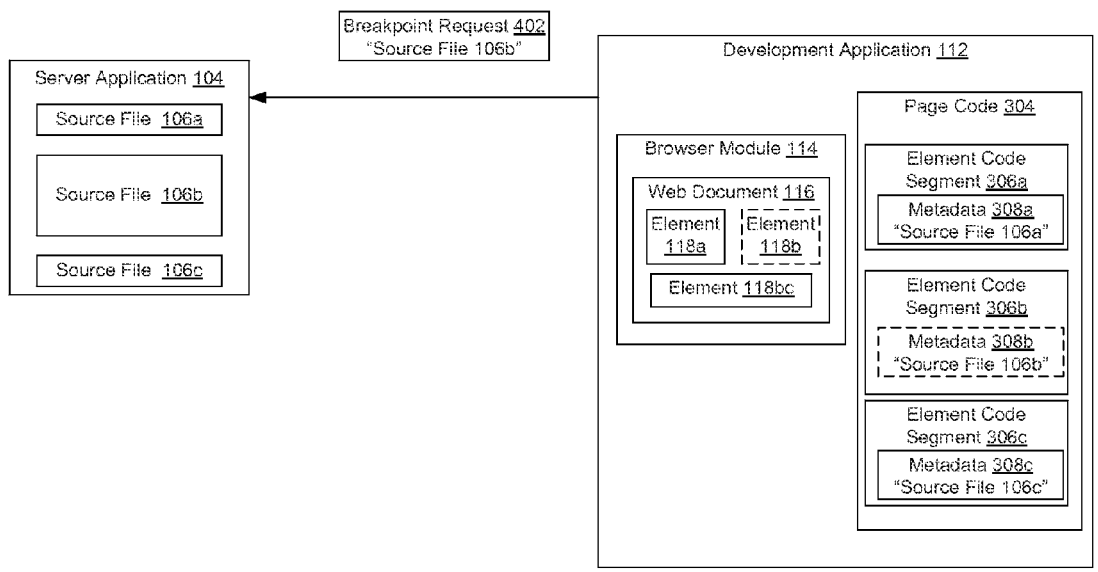
FIG. 4 is a block diagram depicting an example of a flow of communication for providing a breakpoint request from the development application to the server application according to certain exemplary embodiments.

In a non-limiting example, FIG. 4 is a block diagram depicting an example of a flow of communication for providing a breakpoint request 402 from the development application 112 to the server application 104 (e.g., block 220 of FIG. 2). The development application 112 can allow a user to select one of the elements 118a-c in the web document 116 for which breakpoint is to be inserted into a corresponding one of the source files 106a-c. For example, a user may right-click or otherwise select an element 118b in the rendered web document 116. The selection of the element 118b is depicted using dashed lines in FIG. 4. The development application 112 can inspect the page code 304 to identify a corresponding element code segment that is interpreted by the browser module 114 to render the selected element. For example, the development application 112 can determine that the element code segment 306b defines or otherwise corresponds to the element 118b in the rendered web document 116. The development application 112 can identify the metadata 308b that can be used to identify the source file 106b that was used to generate the element code segment 306b. The identification of the metadata 308b is depicted using dashed lines in FIG. 4.

The development application 112 can generate a breakpoint request 402 using the metadata 308b and provide the breakpoint request 402 to the server application 104. A source file 106b can be identified by the server application 104 using the breakpoint request 402. In some embodiments, the breakpoint request 402 can directly identify the source file 106b. For example, the breakpoint request 402 depicted in FIG. 4 includes an identifier of the source file 106b. In other embodiments, the breakpoint request 402 can include an identifier of an element 118b that can be used by the server application 104 to identify the source file 106b.

Returning to FIG. 2, the method 200 also involves responding to the breakpoint request by inserting one or more breakpoints in one or more of the source files, as depicted in block 230. For example, the server application 104 executed by the server system 102 can insert break points in one or more of the source files 106a-c, as applicable. The development application 112 can reload the web document 116 by requesting that the server application 104 execute code in the source files 106a-c up to the inserted breakpoint.

The method 200 also involves providing an updated web document that includes a subset of the element code segments dynamically generated by executing source code up to the inserted breakpoint(s) in the source file(s) 106a-c, as depicted in block 240. The server application 104 can provide the updated web document to the development application 112. The development application 112 can also present relevant source code used to provide the updated web document via a debugging interface that allows the developer to step through the code, inspect variables, etc.

Figure 5:
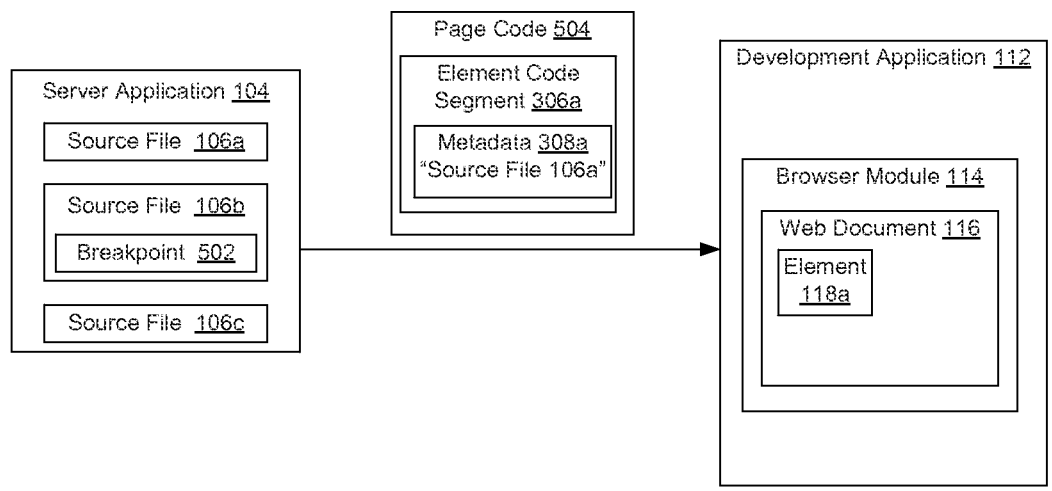
FIG. 5 is a block diagram depicting an example of a flow of communication for providing an updated web document generated using an inserted breakpoint from the server application to the development application according to certain exemplary embodiments.

In a non-limiting example, FIG. 5 is a block diagram depicting an example of a flow of communication for providing or otherwise providing an updated web document 116 from the server application 104 to the development application 112 (e.g., block 240 of FIG. 2). The server application 104 can insert a breakpoint 502 in the source file 106b. In some embodiments, the server application 104 can insert the breakpoint 502 in the source file 106b identified in the breakpoint request 402. In other embodiments, the server application 104 can obtain a unique identifier for an element from the breakpoint request 402 and identify a source file 106b from a look-up table or other file or data that correlates element identifiers to source files. The breakpoint 502 can be inserted in the source file 106b used to generate an element 116b.

The server application 104 can generate page code 504 for the updated web document 116 by re-executing the process used to dynamically generate the web document 116. The server application 104 can execute the source code in at least some of the source files 106a-c, such as the source code in the source file 106a. During the dynamic generation of the page code 504, the server application 104 can encounter the breakpoint 502 in the source file 106b. The server application 104 can pause execution of the source code in the source file 106b. After pausing execution of the source code, the server application 104 can provide the page code 504 to the development application 112.

The breakpoint 502 can be inserted using any suitable process. For example, a developer can use the development application 112 to identify one or more of the elements 118a-118c used to generate a breakpoint 502, such as by right-clicking one of the elements 118a-c in the browser module 114 and selecting "break here" from a contextual menu displayed in response to the right-click. The development application 112 can calculate or otherwise determine an offset of a selected element in a document object model for the web document 116. The offset of the selected element can indicate a number of bytes or other amount of data written to the web document 116 prior to the selected element. The development application 112 can communicate a breakpoint request 402 to the server application 104. The breakpoint request 402 can include a request to halt execution of the source files 106a-c using the offset of the selected element. The server application 104 can execute the source code of the source files 106a-c to generate the web document 116 and can halt or pause execution of the source files 106a-c in response to determining that the number of bytes indicated by the offset has been written to the web document 116.

Each of the elements 118a-c can be mapped to a respective offset in the web document 116 (e.g., the HTML of a dynamically generated web page) via any suitable process. For example, each of the element code segments 306a-c can be annotated or otherwise associated with a unique identifier (e.g. <div . . . custom_id="xyz123">). In some embodiments, one or more element code segments can be nested in other element code segments. A selection of one of the elements 118a-c in the browser module 114 can cause the development application 112 to traverse a document object model for the web document 116 until an element code segment with the unique identifier is found. The development application 122 can search the web document 116 (e.g., raw HTML) to find the unique identifier. The offset can be determined by finding the unique identifier in the web document 116.

The page code 504 can include a subset of the element code segments 306a-c generated by executing source code from the source files 106a-c prior to the breakpoint 502. For example, the page code 504 depicted in FIG. 5 includes element code segment 306a generated by executing source code from the source file 106a (i.e., source code up to the breakpoint 502 in the one source file 106b). The page code 504 does not include the element code segments 306b, 306c that (in the absence of the breakpoint 502) would be generated by executing the source code from the source files 106b, 106c. A user of the development application 112 can thus determine a state of a web application prior to the execution of code following the breakpoint 502 (i.e. a state that includes the element 118a, but not the elements 118b, 118c) or debug the execution of the relevant source code by stepping through the source code, inspecting variables, etc.

In some embodiments, the server application 104 can also provide a portion of the source code adjacent to the breakpoint 502 along with the page code 504 for the updated web document 116. For example, the server application 104 can provide source code from the source file 106b used to generate the element code segment 306b for the element 118b. The user of the development application 112 can examine the provided source code to identify coding errors associated with the generation of the element 118b. For example, the provided source code can be presented in a code editor or other suitable development interface of the development application 112.

In other embodiments, the development application 112 can provide a development interface that displays the source code executed by the server application 104 to generate the web document 116. The server application 104 can halt execution of the source code in response to encountering or otherwise detecting the breakpoint 502. The development interface of the development application 112 can display the source code with the execution halted. For example, a line at which execution was halted can be highlighted or otherwise visually indicated. The developer can use the development interface to step through the code, inspect variables, callstack, etc.

In some embodiments, the development application 112 can send a request to the server application 104 to resume execution of the source code following the breakpoint 502. The server application 104 can resume the execution of the source code in the source files 106b, 106c in response to receiving the request from the development application 112 to resume execution. The server application 104 can provide an additional subset of the element code segments to the development application 112. For example, the server application can provide element code segments 306b, 306c that are dynamically generated by resuming the execution of the source code in the source files 106b, 106c after the breakpoint 502.

Figure 6:
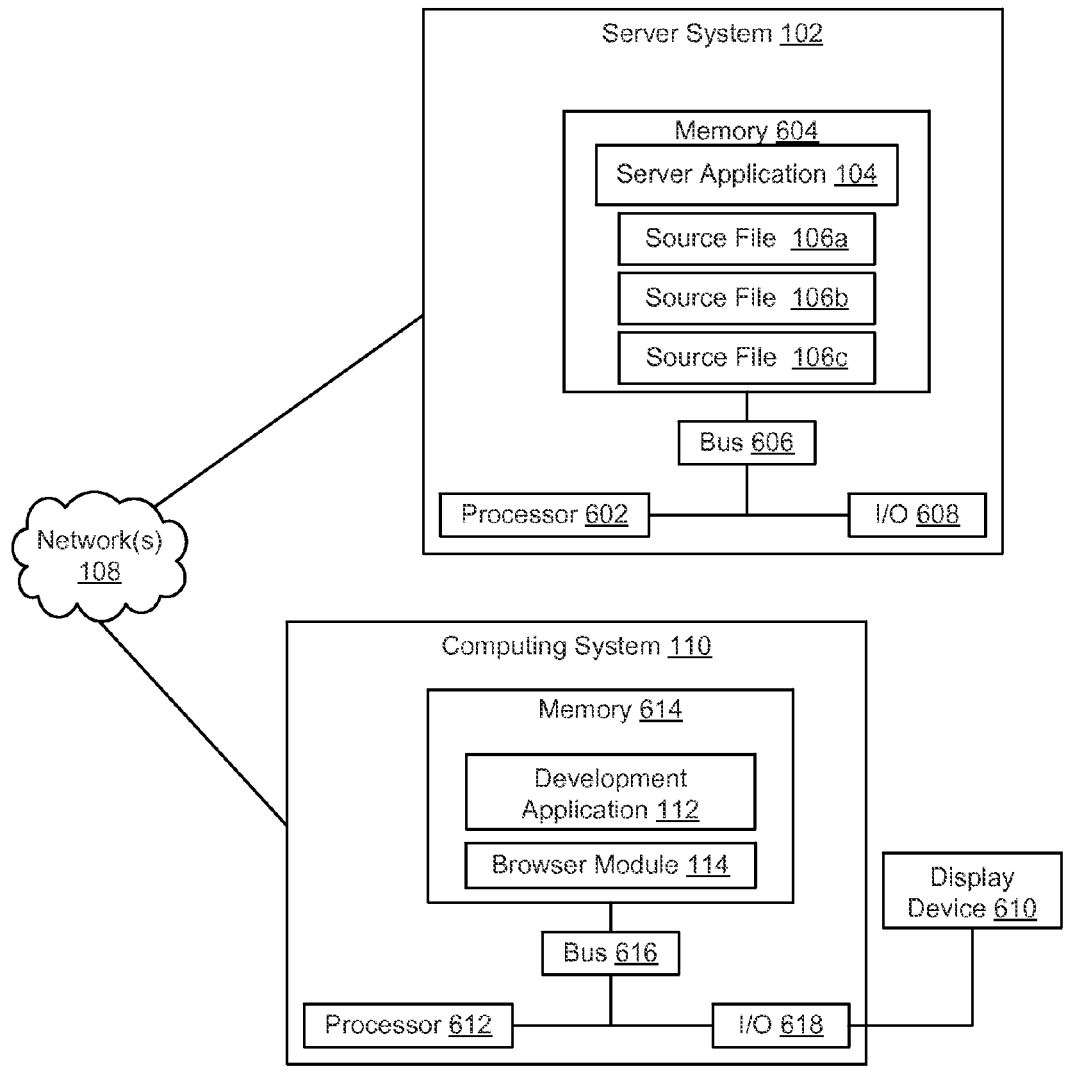
FIG. 6 is a block diagram depicting examples of a server system and a computing system for implementing certain embodiments.

Any suitable computing systems can be used to implement the systems and process depicted in FIGS. 1-5. For example, FIG. 6 is a block diagram depicting examples of a server system 102 and a computing system 110 for implementing certain embodiments.

The server system 102 and the computing system 110 can respectively include processors 602, 612. Each of the processors 602, 612 may include a microprocessor, an application-specific integrated circuit ("ASIC"), a state machine, or other suitable processing device. Each of the processors 602, 612 can include any number of processing devices, including one. Each of the processors 602, 612 can be communicatively coupled to a computer-readable medium, such as memories 604, 614. The processors 602, 612 can execute computer-executable program instructions and/or accesses information respectively stored in the memories 604, 614. The memories 604, 614 can store instructions that, when executed by the respective processors 602, 612, cause the respective processors 602, 612 to perform operations described herein. Examples of such instructions include the server application 106 and the development application 112. In some embodiments, the source files 106a-c can be stored in the memory 604, as depicted in FIG. 6. In other embodiments, the server system 102 can access remote source files 106a-c stored at a different location via the network 108.

A computer-readable medium may include (but is not limited to) an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The server system 102 and the computing system 110 can also include respective buses 606, 616 and respective input/output ("I/O") interfaces 608, 618. The buses 606, 616 can communicatively couple one or more components of the server system 102. The I/O interfaces 608, 618 can receive input from input devices (e.g., a keyboard, a mouse, a touch screen, etc.) and provide output to output devices. For example, the processor 612 can provide output such as a rendered version of a web document to a display device 610 via the I/O interface 618.

The server system 102 can include any suitable computing system or group of computing systems for executing the server application 106. In some embodiments, the server system 102 may be a single computing system. In other embodiments, the server system 102 may be a virtual server implemented using a number of computing systems connected in a grid or cloud computing topology.

The computing system 110 can include any suitable computing device for executing the development application 112. Non-limiting examples of a computing device include a desktop computer, a tablet computer, a laptop computer, or any other computing device.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
providing, by a server system, a web document to a remote development application, wherein the server system dynamically generates the web document by executing source code from a plurality of source files, wherein the web document comprises element code segments for rendering respective elements of the web document in a browser, wherein each of the element code segments includes respective metadata for identifying a respective one of the plurality of source files used to generate the element code segment;
receiving, by the server system, a breakpoint request from the development application to insert at least one breakpoint in at least one source file of the plurality of source files;
inserting, by the server system, the at least one breakpoint in the at least one source file responsive to the breakpoint request; and
providing, by the server system, an updated web document to the development application, wherein the updated web document includes a subset of the element code segments that are dynamically generated by executing the source code up to the at least one breakpoint in the at least one source file,
wherein the breakpoint request comprises an offset value, wherein inserting the at least one breakpoint comprises inserting the breakpoint after an amount of data specified by the offset value in the web document is generated, wherein the data is generated by executing source code up to the at least one breakpoint in the at least one source file.

2. The method of claim 1, wherein the web document is a markup language document and the element code segments comprise markup language elements.

3. The method of claim 1, further comprising providing a portion of the source code adjacent to the breakpoint with the updated web document.

4. The method of claim 3, wherein providing the portion of the source code comprises:
providing the source code of the sources files to a development interface of the development application during execution of the source code; and
providing the portion of the source code for display in the development interface with an indicator that the execution of the source code is halted at the portion of the source code.

5. The method of claim 1, further comprising generating the updated web document by:
executing the source code in at least some of the plurality of source files to generate the subset of the element code segments;
encountering the at least one breakpoint during execution of the source code; and
pausing the execution of the source code in response to the at least one breakpoint, wherein the updated web document comprises the subset of the element code segments generated prior to pausing the execution of the source code.

6. The method of claim 5, further comprising:
resuming the execution of the source code in response to receiving a request from the development application to resume the execution; and
providing an additional subset of the element code segments to the development application, wherein the additional subset is generated after resuming the execution of the source code.

7. The method of claim 1, wherein page code for the web document is dynamically generated by a server application in response to a request from the development application.

8. The method of claim 1, wherein the breakpoint request is generated in response to selecting an element of the web document by the development application and is generated based on the metadata of the web document for identifying the respective source file used to generate the element code segment corresponding to the selected element.

9. A server system comprising:
a processor; and
a non-transitory computer-readable medium communicatively coupled to the processor,
wherein the processor is configured for executing instructions stored in the non-transitory computer-readable medium to perform operations comprising:
providing a web document to a remote development application, wherein the server system dynamically generates the web document by executing source code from a plurality of source files, wherein the web document comprises element code segments for rendering respective elements of the web document in a browser, wherein each of the element code segments includes respective metadata for identifying a respective one of the plurality of source files used to generate the element code segment,
receiving a breakpoint request from the development application to insert at least one breakpoint in at least one source file of the plurality of source files,
inserting the at least one breakpoint in the at least one source file responsive to the breakpoint request, and
providing an updated web document to the development application, wherein the updated web document includes a subset of the element code segments that are dynamically generated by executing the source code up to the at least one breakpoint in the at least one source file,
wherein the breakpoint request comprises an offset value, wherein inserting the at least one breakpoint comprises inserting the breakpoint after an amount of data specified by the offset value in the web document is generated, wherein the data is generated by executing source code up to the at least one breakpoint in the at least one source file.

10. The system of claim 9, wherein the web document is a markup language document and the element code segments comprise markup language elements.

11. The system of claim 9, wherein the operations further comprise:
providing the source code of the sources files to a development interface of the development application during execution of the source code; and
providing a portion of the source code for display in the development interface with an indicator that the execution of the source code is halted at the portion of the source code.

12. The system of claim 9, wherein the operations further comprise:
executing the source code in at least some of the plurality of source files to generate the subset of the element code segments;
encountering the at least one breakpoint during execution of the source code; and pausing the execution of the source code in response to the at least one breakpoint, wherein the updated web document comprises the subset of the element code segments generated prior to pausing the execution of the source code.

13. The system of claim 12, wherein the operations further comprise:
    resuming the execution of the source code in response to receiving a request from the development application to resume the execution; and
    providing an additional subset of the element code segments to the development application, wherein the additional subset is generated after resuming the execution of the source code.

14. A non-transitory computer-readable medium embodying program code executable by a processing device, the non-transitory computer-readable medium comprising:
    program code for providing a web document to a remote development application, wherein the server system dynamically generates the web document by executing source code from a plurality of source files, wherein the web document comprises element code segments for rendering respective elements of the web document in a browser, wherein each of the element code segments includes respective metadata for identifying a respective one of the plurality of source files used to generate the element code segment;
    program code for receiving a breakpoint request from the development application to insert at least one breakpoint in at least one source file of the plurality of source files;
    program code for inserting the at least one breakpoint in the at least one source file responsive to the breakpoint request; and
    program code for providing an updated web document to the development application, wherein the updated web document includes a subset of the element code segments that are dynamically generated by executing the source code up to the at least one breakpoint in the at least one source file,
    wherein the breakpoint request comprises an offset value, wherein inserting the at least one breakpoint comprises inserting the breakpoint after an amount of data specified by the offset value in the web document is generated, wherein the data is generated by executing source code up to the at least one breakpoint in the at least one source file.

15. The non-transitory computer-readable medium of claim 14, further comprising:
    program code for providing the source code of the sources files to a development interface of the development application during execution of the source code; and
    program code for providing a portion of the source code for display in the development interface with an indicator that the execution of the source code is halted at the portion of the source code.

16. The non-transitory computer-readable medium of claim 14, further comprising:
    program code for executing the source code in at least some of the plurality of source files to generate the subset of the element code segments;
    program code for encountering the at least one breakpoint during execution of the source code; and
    program code for pausing the execution of the source code in response to the at least one breakpoint, wherein the updated web document comprises the subset of the element code segments generated prior to pausing the execution of the source code.

17. The non-transitory computer-readable medium of claim 16, further comprising:
    program code for resuming the execution of the source code in response to receiving a request from the development application to resume the execution; and
    program code for providing an additional subset of the element code segments to the development application, wherein the additional subset is generated after resuming the execution of the source code.

* * * * *